United States Patent
Boesl

(10) Patent No.: US 9,994,133 B2
(45) Date of Patent: Jun. 12, 2018

(54) HEADREST AND MOUNT THEREFOR

(71) Applicant: GRAMMER AG, Amberg (DE)

(72) Inventor: Manuel Boesl, Freudenberg (DE)

(73) Assignee: GRAMMER AG, Amberg (DE)

( * ) Notice: Subject to any disclaimer, the term of this patent is extended or adjusted under 35 U.S.C. 154(b) by 67 days.

(21) Appl. No.: 14/994,698

(22) Filed: Jan. 13, 2016

(65) Prior Publication Data

US 2016/0200229 A1   Jul. 14, 2016

(30) Foreign Application Priority Data

Jan. 14, 2015 (DE) ........................ 10 2015 000 108

(51) Int. Cl.
    *B60N 2/824* (2018.01)
    *B60N 2/48* (2006.01)

(52) U.S. Cl.
    CPC .......... *B60N 2/4805* (2013.01); *B60N 2/806* (2018.02); *B60N 2/809* (2018.02); *B60N 2/824* (2018.02); *B60N 2/897* (2018.02)

(58) Field of Classification Search
    CPC ...... B60N 2/48; B60N 2/4805; B60N 2/4808; B60N 2/482; B60N 2/4823; B60N 2/4826; B60N 2002/4897; B60N 2/80; B60N 2/806; B60N 2/821; B60N 2/824; B60N 2/826; B60N 2/897
    See application file for complete search history.

(56) References Cited

U.S. PATENT DOCUMENTS

| 5,998,737 | A  | * | 12/1999 | Weiss ........................ F16L 3/08 174/135 |
| 7,044,556 | B1 | * | 5/2006  | Yetukuri .............. B60N 2/4814 297/410 |
| 7,410,219 | B2 |   | 8/2008  | Kraft |
| 8,794,705 | B2 |   | 8/2014  | Steinmetz |
| 2005/0168037 | A1 | * | 8/2005 | Runde ...................... B60N 2/48 297/404 |
| 2012/0080925 | A1 | * | 4/2012 | Steinmetz ............ B60N 2/4814 297/391 |
| 2012/0200135 | A1 | * | 8/2012 | Muto ................... B60N 2/4823 297/410 |

FOREIGN PATENT DOCUMENTS

| DE | 19608851 A    | 9/1997  |
| DE | 19954862 A    | 8/2000  |
| DE | 102005043811 A | 5/2006 |
| DE | 1002011100819 A | 11/2012 |

* cited by examiner

*Primary Examiner* — Ryan D Kwiecinski
(74) *Attorney, Agent, or Firm* — Andrew Wilford

(57) ABSTRACT

The invention relates to a bearing for a support rod (13a, 13b) of a headrest (11) for vehicle seats, having at least one frame (16) forming an opening (17) through which the support rod (13a, 13b) can pass, wherein the frame (16) at least partially engages around the opening (17), wherein the bearing (10) has at least one contact region (18) for contacting the outer surface (27) of the support rod (13a, 13b) that is connected by a connector to a support region (28) that is part of the frame (16).

7 Claims, 8 Drawing Sheets

HEADREST AND MOUNT THEREFOR

FIELD OF THE INVENTION

The invention relates first to a bearing for a headrest of a vehicle seat.

BACKGROUND OF THE INVENTION

Such a headrest has a head part to brace the head of a passenger in the vehicle seat. The head part is held on a vehicle structure by at least one support rod that can be formed for example by the backrest of the vehicle seat. Within the context of the invention, the free end of a support rod bracket is also a support rod. The head part is held on the support rod by at least one bearing, and the support rod is mounted on the vehicle structure by at least one bearing.

DE 10 2011 100 819 discloses a motor vehicle seat with a headrest. The headrest holder bars in this case are mounted in a support frame having bearing elements. Contact regions of the bearing elements lie opposite each other, and at least one of the bearing elements has a flexible design to form a force fit with the holder bar. The bearing elements are functionally connected to a support frame.

DE 10 2005 019 946 [U.S. Pat. No. 7,410,219] describes an attachment device for the headrest of a vehicle seat. The headrest bars are mounted in guide sleeves each held in a socket of the vehicle seat. Elastic spring shackles are constructed in the guide sleeves and press the headrest bars against inner surfaces of the guide sleeves. A spring is attached to the guide sleeve, is supported on the guide sleeve, and exerts a clamping force on the headrest bar.

DE 196 08 851° C.2 relates to a guide sleeve in which a spring element also exerts a radial force on a resilient tongue of the guide sleeve such that the tongue presses against the support rod.

DE 10 2005 043 811 describes a headrest having a support rod mounted in a guide of the backrest. The guide holds at least one bearing element forming a bearing surface projecting toward the support rod.

DE 10 2010 041 878 [U.S. Pat. No. 8,794,705] describes a headrest in which a support rod of the headrest is mounted by bearing elements held on an upholstered support of the headrest and elastically pretensioned toward the support rod. A spring clamp serves for pretensioning, is supported on an outer side of the bearing element fixed to the upholstery support, and presses its free ends radially inward. The bearing elements have on an inner periphery guide rods that project toward support rods.

OBJECT OF THE INVENTION

The object of the invention is to create a bearing that can compensate for tolerances in the shape of the support rod and the spacing between two support rod ends, all while holding the headrest in the bearing without rattling.

SUMMARY OF THE INVENTION

The object is first attained by a headrest in which the bearing serves the purpose of holding the support rod of a headrest for vehicle seats. The bearing has according to the invention at least one frame forming an opening through which a support rod can engage, and also forms at least one contact region that is made to lie against the outer surface of the support rod. The bearing particularly has at least two contact regions. By way of example, two, three, or four contact regions can be included. The contact regions can, by way of example, be distributed evenly around the circumference of the support rod. According to one embodiment, at least one first contact region is mounted mechanically independently of at least one second contact region, and can move in the radial direction.

The force exerted by a contact region on the support rod is at least partially borne, for example, by at least one other contact region forming a counter bearing. In this way, the support rod has a floating mount in the guide.

The guide can be fixed, by way of example, to the seat or to the head part. The guide can be constructed from a bearing sleeve or a structure that at least partially engages around the periphery of the support rod, the structure being connected to the backrest or to the head part. "Connected" in this context can mean, for example "attached thereon" or "constructed as a single piece with the same." The structure can be designed in such a manner that it can receive the forces that act in the direction of at least two spatial axes, for example.

The contact region is functionally connected to a connector. The connector is connected to a support region of the guide. Within the context of the invention, this means that tensile and/or compressive forces can be transmitted by the connector between the contact region and the guide. The support region is formed by a wall of the frame, the wall bounding the opening, by way of example. The support region can be designed directly next to the guide or to a separate element.

The connector is made to be able to move, by way of example, elastically and radially. In this manner, the contact region can move toward the support rod and away from the support rod. The elasticity can be dependent on the shape and the material of the connector. According to one alternative embodiment, or additionally, the connector is mounted on the support region to allow movement. In this case, a spring, for example, can stress the connector radially into the opening.

The connector is formed, by way of example, by an arm, wherein the contact region is functionally connected to the arm. The arm extends from the support region on the guide into the opening, for example. By way of example, it can extend into the opening from a wall that bounds the opening. The arm alternatively or additionally extends around the periphery around the opening, for example. The arm in this case extends around at least a part of the outer periphery of the support rod that engages through the opening. The arm is fixed to the contact region, for example. The contact region is particularly part of the arm—that is, it is constructed as a single piece with the same. The arm is fixed to the support region, by way of example. The arm is particularly molded onto the frame.

According to one embodiment, the arm can deform elastically. In this way, it can move radially, and move toward the support rod and away from the support rod. If a support rod is positioned in the guide, the arm is pushed elastically, radially out of its resting position, due to an interference fit between the outer surface of the support rod and the contact region, by way of example, and exerts a pretensioning force against the contact region in such a manner that the contact region is stressed into contact on the outer surface. According to one alternative, or in addition, the arm is mounted on the support region in a manner allowing movement, by way of example, and stressed radially into the opening by a spring.

According to one embodiment, a spring acts directly or indirectly on the contact region and urges the contact region against the outer surface of the support rod. The spring force of the spring can act on the connector, for example. The spring exerts a force on multiple contact regions, for example, and urges these against the support rod. All contact regions are equally stressed by the spring, by way of example. The spring can support the elastic reset force of the connector, for example. The spring force of the spring acts in the same direction as the elastic reset force of the connector.

The contact face of the circular element on the contact region and/or the connector is designed as a ramp, by way of example. In this way, an increased spring force can be exerted on the contact region or certain regions of the connector.

All suitable materials, such as silicone, metal, and plastic, by way of example, can be considered for the material for the springs. All different shapes are possible, including coil springs, single rings, etc.

The spring length affects the characteristic curve of the spring. A flat characteristic spring curve—that is, a weak relationship of spring force to spring travel, can be achieved by a long spring length, for example. The influence of the normal force acting on the holding bar is then low at different tolerances and temperatures. The actuating forces remain approximately constant.

According to a further embodiment of the invention, the spring is designed as a circular spring. Circular springs in the context of the invention are springs designed as closed rings or as an open ring that at least partially surrounds the opening and/or the periphery of the support rod. The circular spring exerts, by way of example, a force on the contact region that is evenly distributed over the periphery. The circular spring is supported, for example, only on the support rod, rather than on the vehicle structure. According to one alternative embodiment, the circular element is supported at least partially on the vehicle structure. The contact regions are connected via the circular springs, by way of example. The movements of the contact regions can be coupled to each other, by way of example, by the circular spring. Forces that act on a contact region can be transmitted to other contact regions by the circular spring.

According to one embodiment of the invention, the circular springs engage at least partially around the contact region and/or the connector. The contact region or the connector with the contact region can be stressed by the circular spring, by way of example, into contact with the outer surface of the support rod. If the connector is designed as an arm that extends along the periphery around the opening, the spring can lie against the arm over its entire length, and stress the arm radially toward the opening and/or the support rod.

In a further embodiment of the invention, the forces exerted by the contact regions onto the outer surface of the support rod cancel each other out. This is possible, by way of example, if at least two or at least three contact regions lie on the outer periphery with an offset of 180° or 120°, respectively, and the forces by the contact regions on the outer surface of the support rod are equal and are oriented such that they cancel each other out. According to a further embodiment of the invention, the circular spring biases at least two contact regions in such a manner that the support rod is centered inside of the opening.

One embodiment of the invention is characterized in that the frame is part of a guide, and for example is molded onto the guide. According to one alternative embodiment, the frame is attached on the guide. By way of example, the frame is designed as an insert that can be attached to the guide.

The insert can attach, and particularly can lock, by way of example, in a seat of the guide. The insert can be designed, by way of example, in the shape of a cassette that can be attached in the seat of the guide. The circular element can be easily installed in this way.

According to a second aspect, the invention relates to a headrest having a head part that is held on the vehicle structure, particularly the backrest of a vehicle seat, by at least one support rod. The headrest has bearings by means of which the head part is mounted on the support rod. The mount can enable, by way of example, a height adjustment on the support rod—that is, a relative movement between the head part and the support rod. In addition, the support rod is held in a bearing that is fixed on the vehicle structure.

The problem addressed by the invention was that of creating a headrest, wherein the head part is mounted in a fail-safe and rattle-free manner even if there are deviations in the size of the support rods and if there is, optionally, a deviation in the spacing between two support rods.

The headrest has the special feature that the head part is mounted by at least one bearing described above. In order to avoid repetition, reference is hereby made concerning the advantages of the invention to the explanations that were given above in relation to the bearing according to the invention.

BRIEF DESCRIPTION OF THE DRAWING

Additional advantages of the invention are detailed in the description of an embodiment shown in the schematic figures in which.

SPECIFIC DESCRIPTION OF THE INVENTION

Figure 1:
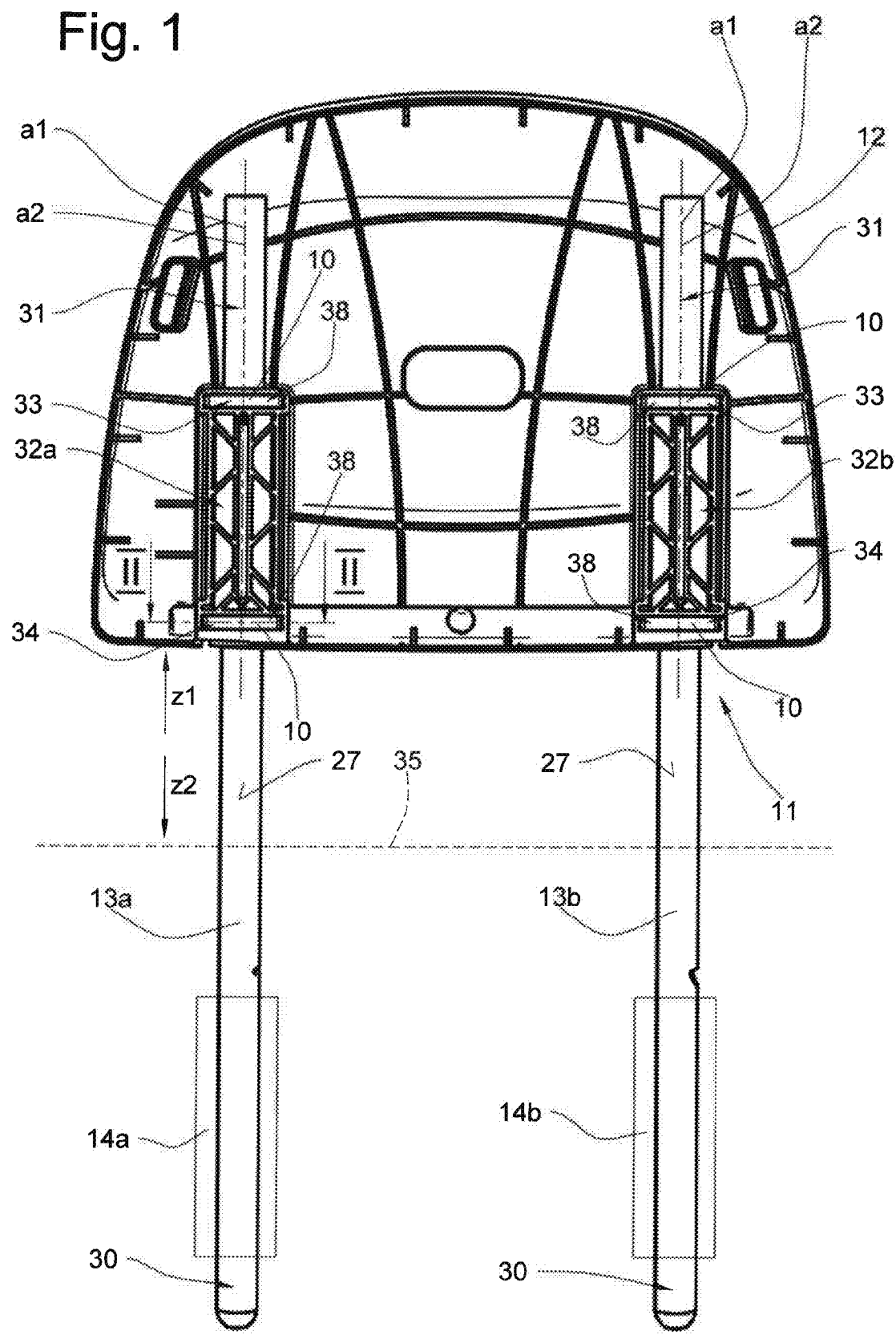
FIG. 1 is a rear view of a headrest in which a rear shell of the head part is not shown.

The bearing according to the invention as a whole is identified in the drawings with reference 10. Reference numbers that are the same in the different figures indicate the same parts, whether or not appended with lowercase letters.

The bearing 10 is used for holding a head part 12 of a headrest 11 as shown in FIG. 1. FIG. 1 is a rear view of the headrest 11. The headrest 11 comprises the head part 12 as well as support rods 13*a* and 13*b*. The head part 12 is mounted on a seat back 35 of a vehicle seat that is not shown in greater detail, by the support rods 13*a* and 13*b*. In FIG. 1, a rear shell of the head part 12 comprising two shells is not shown. The head part 12 can be displaced for example relative to the support rods 13*a* and 13*b* in the directions z1 and z2.

Lower ends 30 of the support rod 13a and 13b engage in respective bearings 14a and 14b. Each bearing 14a and 14b is fixed to the structure of the seat back 35. The lower ends 30 of the support rods 13a and 13b are secured in the respective bearings 14a and 14b and for example are detachably fixed therein. The bearings 14a and 14b are designed for example as sleeves.

Upper ends 31 of the support rod 13a and 13b are mounted in respective guides 32a and 32b of the head part 12. Each guide 32a and 32b is fixed to the head part 12 and has an upper bearing seat 33 and a lower bearing seat 34 between which an insert 38 is fixed to the bearing 10.

Figure 2:
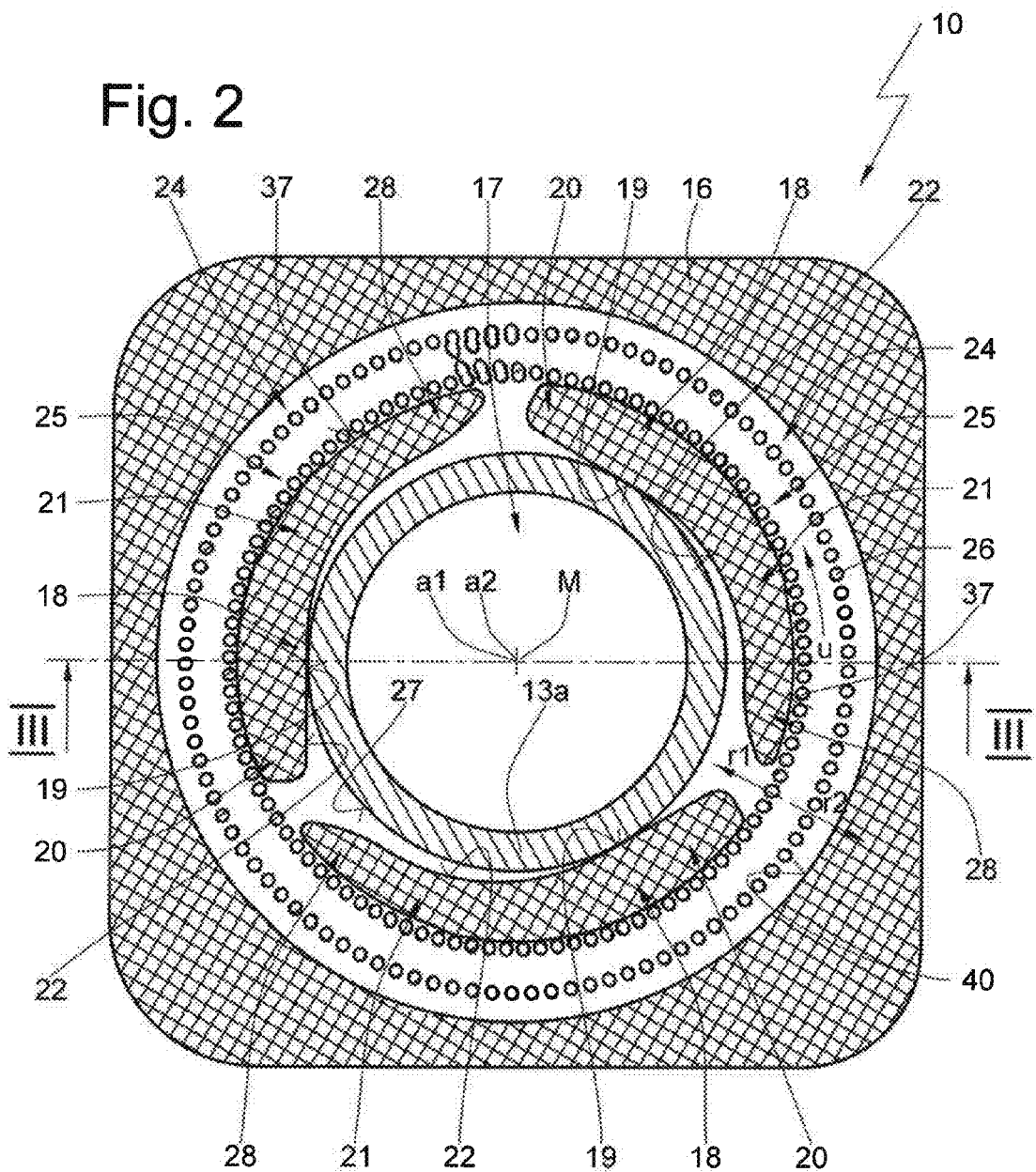
FIG. 2 is a section along line II-II in FIG. 1 in which the head part is not shown.

A sectional view of the insert 38 is shown in FIG. 2. The insert 38 comprises a frame 16 forming an opening 17. The support rod 13a engages for example through the circular opening 17. The frame 16 completely surrounds the opening 17. Three elastically deformable arms 21 project into the opening 17 and each have a contact region 18 with an outer contact face 19. The contact region 18 is on a free end 20 of the arm 21.

Each arm 21 is connected to the frame 16 at a support region 28 of an inner surface 40 that bounds the opening 17. In this embodiment, the arm 21 is unitary with the frame 16. Each arm 21 extends angularly from the support region 28 along the periphery u around a center point M of the opening 17. Moreover, each arm 21 is angled radially inward in the direction r1 toward the support rod 13a. The arms 21 are mounted on the frame 16 independently of each other, and their free ends 20 can move radially in directions r1 and r2 independently of one another.

The arms 21 form respective concavities 22 of the bearing 10 that are turned toward an opening 17. Respective gaps 24 are formed by sides 23 of the arm 21 turned away from the respective concavities 22 and extend angularly around the periphery u relative to the center point M. Each arm 21 can accordingly move elastically radially outward in the direction r2.

Figure 3:
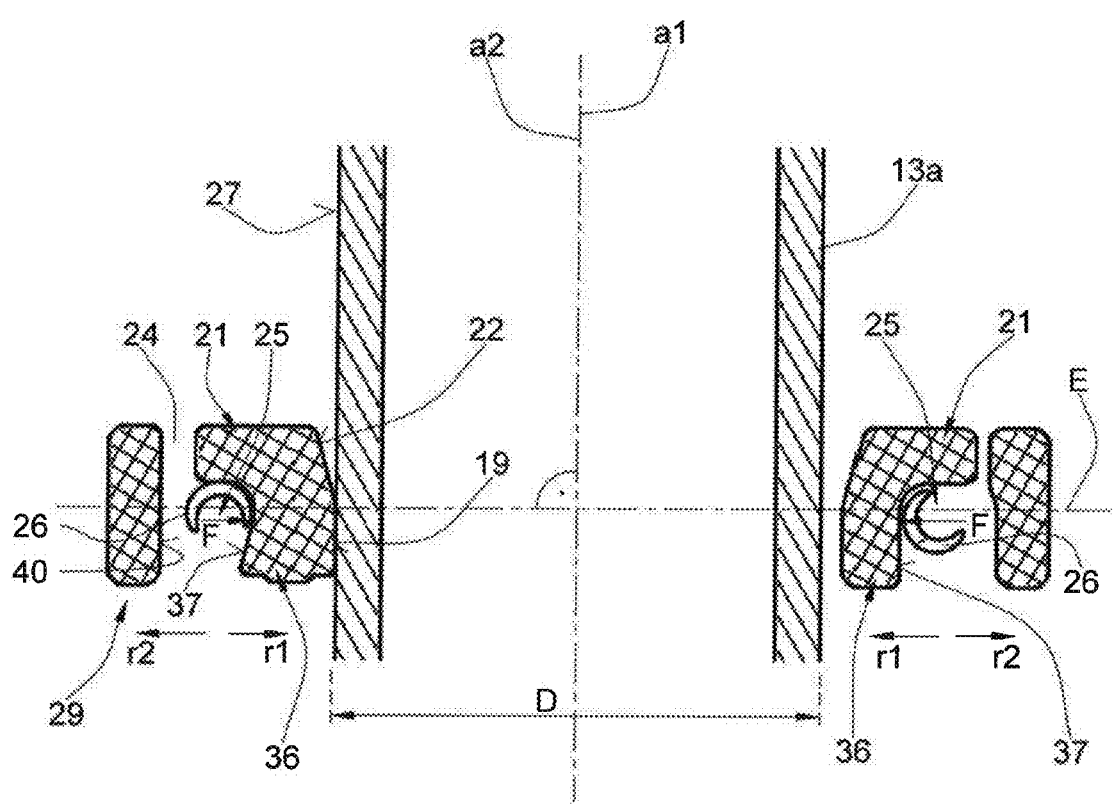
FIG. 3 is a section along line III-III in FIG. 2.
Figure 4:
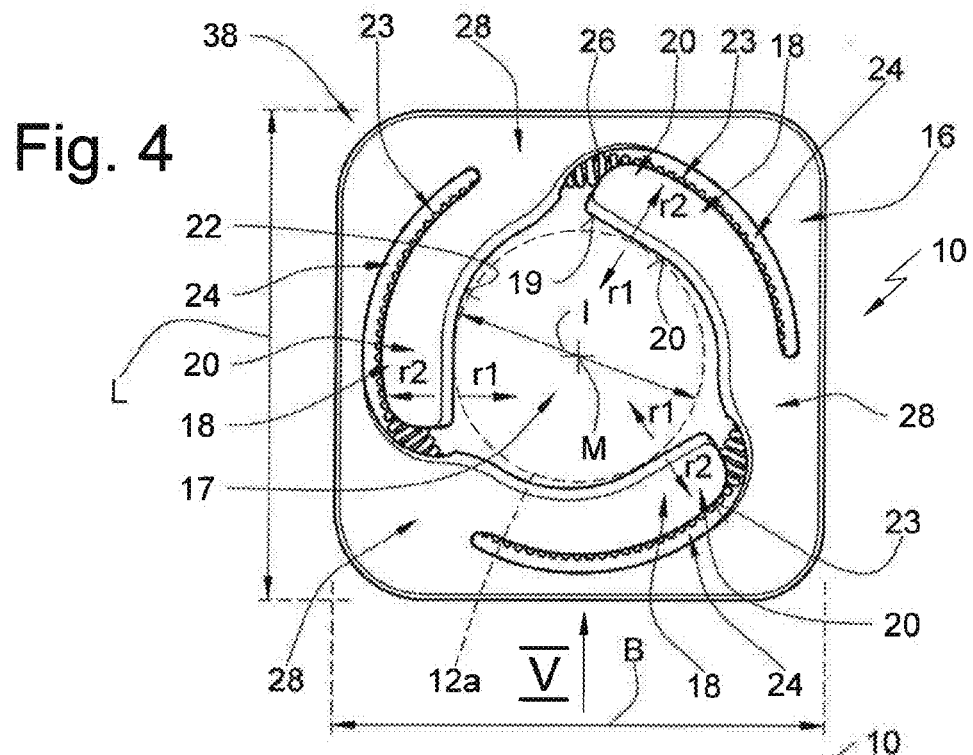
FIG. 4 is a top view of the bearing.

FIG. 4 shows the insert 38 with the bearing 10 as a single piece. An inner diameter I defined by the concavities 22 is the diameter of a circle around the center point M that is tangent to the contact faces 19. The support rod 13a in place has an outer diameter D (see FIG. 3) that is bigger than the inner diameter I (see FIG. 4). The arms 21 are therefore deformed in the direction r2, thereby pressing the outer contact faces 19 in the direction r1 against an outer surface 27 of the support rod 13a due to the elastic return force of the arm 21.

Each arm 21 has on its underside 29 a recess 25 forming a seat (see FIGS. 2 and 3, for example). Because of the recess 25, a part 36 projects from each arm 21 parallel to a longitudinal center line a1 of the guide 14a, and forms a contact face 37. The contact face 37 has the shape of a circular arc. An annular spring 26 is fitted in the seats 25. The spring 26 is for example formed by a coil spring 26 whose ends are attached to each other. However, as an alternative, the spring 26 can for example also be formed by a silicone ring or another suitable spring. The spring 26 contacts the contact faces 37 over approximately the entire longitudinal extension of each of the respective arms 21, and exerts a radial force F on the contact faces 37 in the direction r1, thereby urging all the contact faces 19 evenly in the direction r1 against the outer surface 27 of the support rod 13a.

FIG. 3 shows that the longitudinal center line a1 of the guide 14a runs through the center point M of the circular opening 17. A longitudinal center line a2 of the support rod 13a coincides in the embodiment with the longitudinal center line a1. FIGS. 3 and 4 show that the insert 38 is shaped as a plate that extends in a plane E transverse to the longitudinal center line a2 of the support rod 13a—here at a right angle to the longitudinal center line a2.

In each position of the support rod 13a relative to the arms 21, the contact faces 19 are held on the outer surface 27 such that the headrest 11 is mounted without rattle. The support rod 13a is not pressed in a particular direction against the frame 16 and/or the guide. It has a floating mount in the opening 17. Even in the event that the longitudinal center line a2 is spaced from the longitudinal center line a1, and therefore the support rod 13a is not arranged in the center of the opening 17, the contact faces 19 are held on the outer surface 27.

FIGS. 2 and 3 are sectional views of the insert 38 that is in the bearing seat 33 for the purpose of mounting the support rod 13a.

The explanations given related to this insert 38 also apply in the same way for all other inserts 38—that is, for the insert 38 in the bearing seat 34 of the guide 32, and the inserts positioned in the bearing seats 33 and 34 of the guide 32b.

Figure 5:
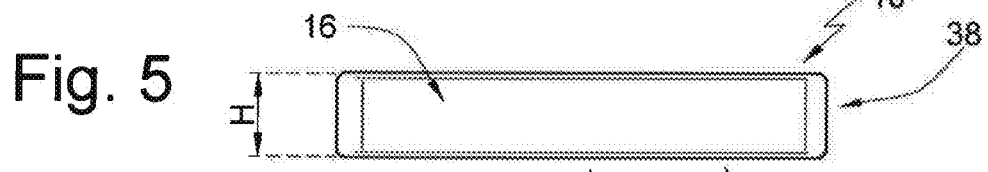
FIG. 5 is a view according to view arrow V in FIG. 4.
Figure 6:
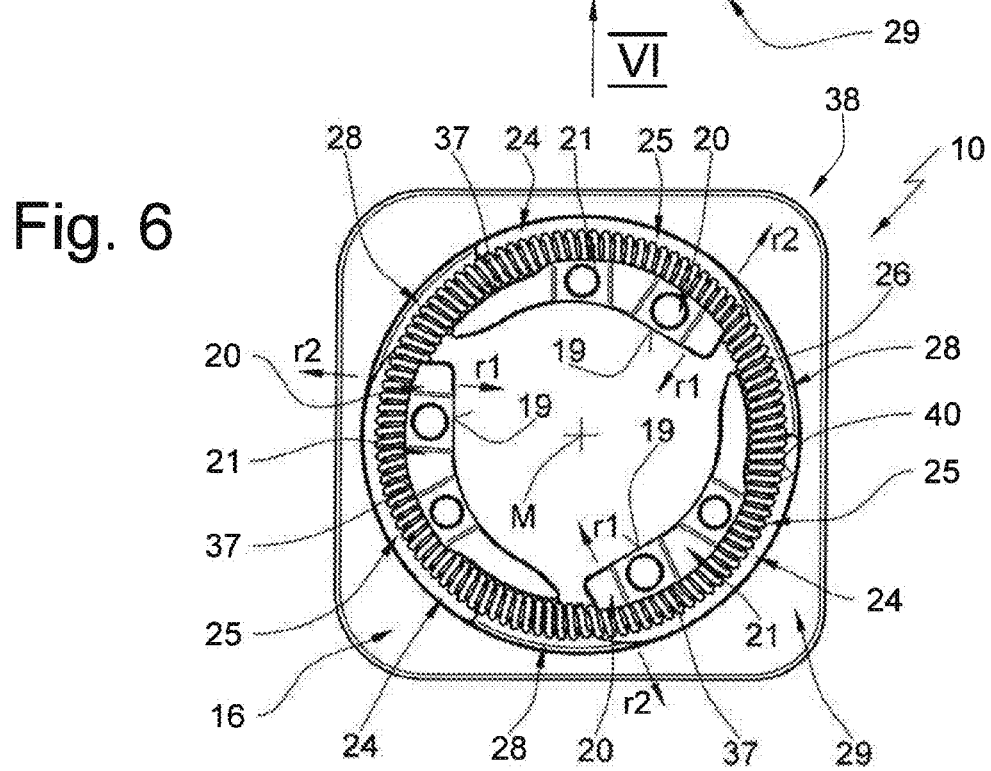
FIG. 6 is a view according to view arrow VI in FIG. 5.
Figure 7:
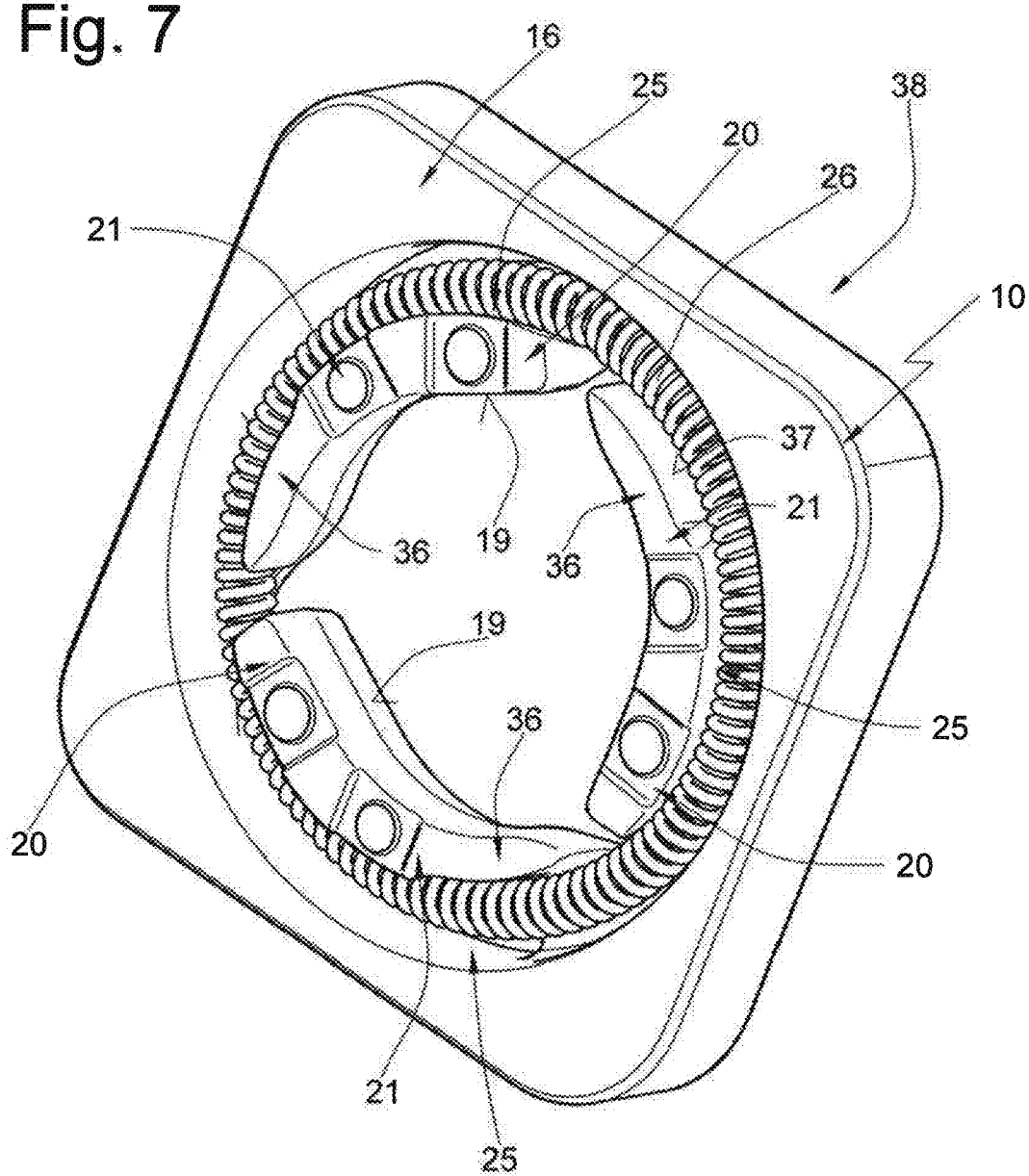
FIG. 7 is a perspective view from below of the bearing shown in FIG. 6.
Figure 8:
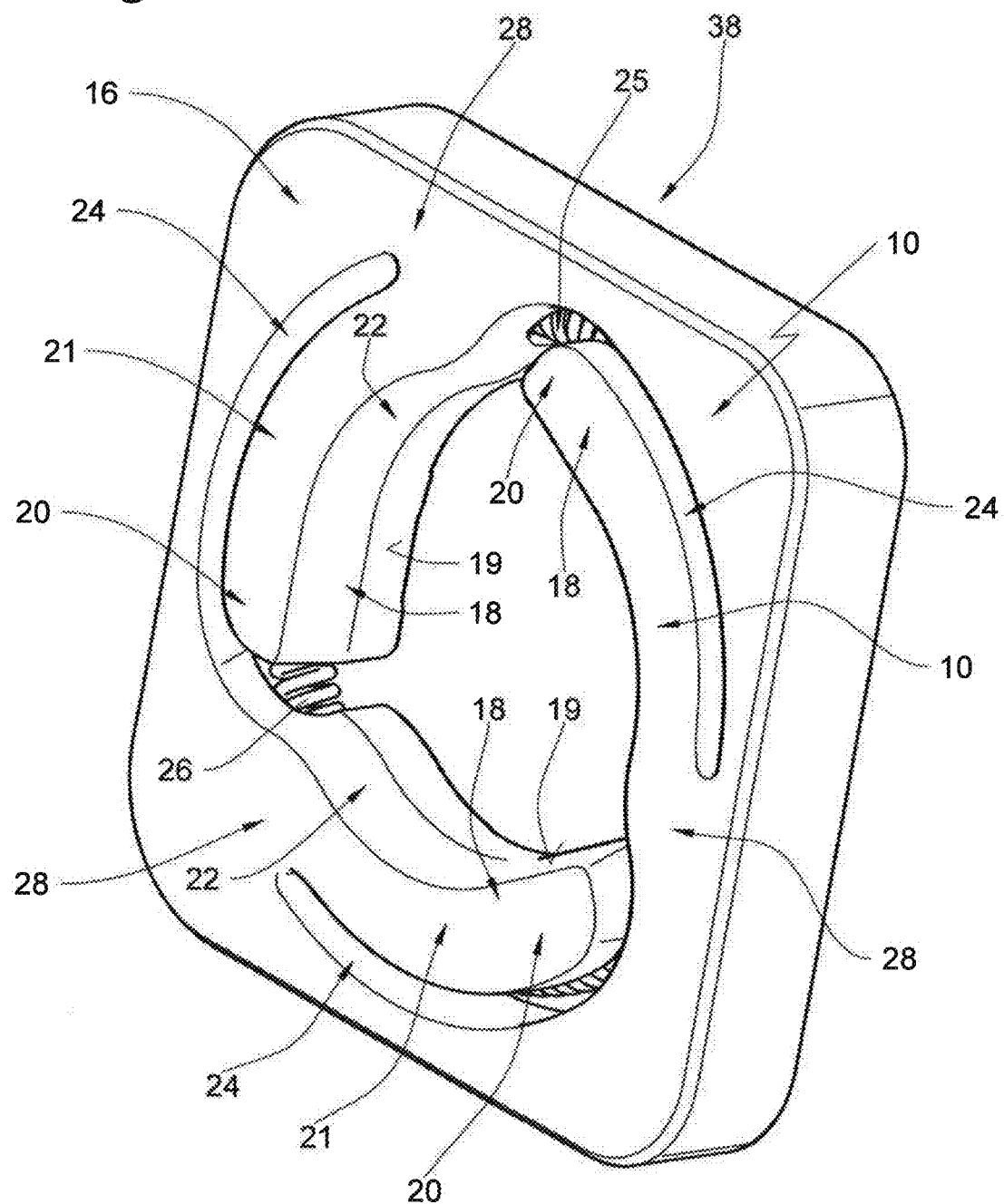
FIG. 8 is a perspective view from above of the bearing shown in FIG. 4.
Figure 9:
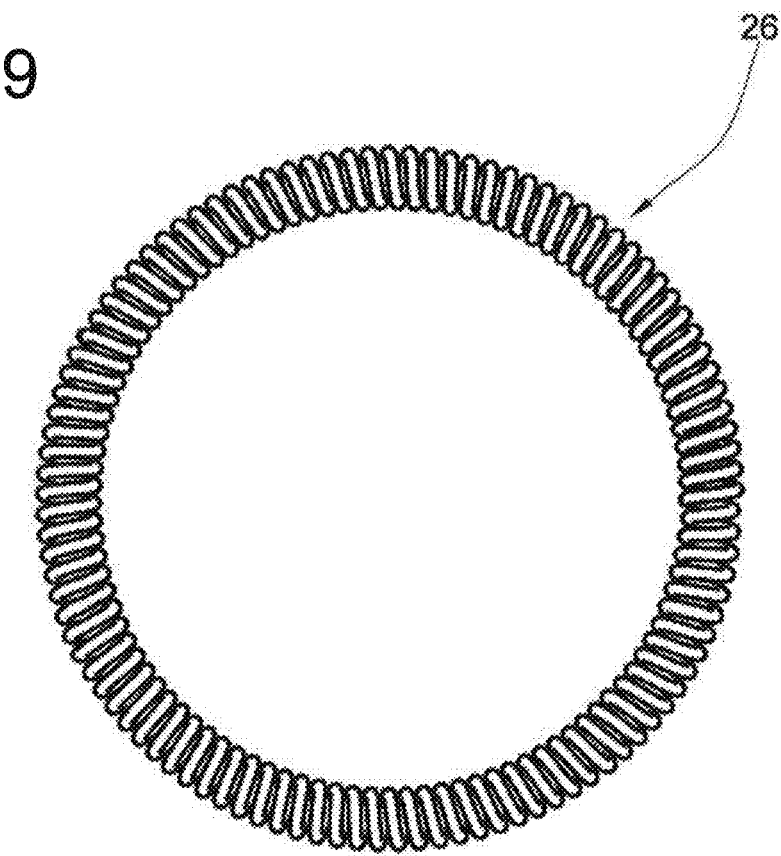
FIG. 9 is a top view of the spring shown as a single piece.

The insert 38 is shown in FIGS. 4 to 8 as an assembly. FIG. 4 shows that the insert 38 has three arms 21 each of which extends around approximately 120° of the opening 17, and they form at their outer ends 20 the contact region 18. The contact regions 18 are offset at 120° to each other. The axial height H of the insert 38 shown in FIG. 5 is less than the length L and the width B. In particular FIG. 6 shows that the spring 26 contacts the contact face 37 substantially over the entire length of the arm 21. FIG. 9 shows a top view of the spring 26 as a single piece.

The outer contact face 19 lies against the outer surface 27, and prevents the headrest 11 from rattling, not only in cases where the intended position of the support rods 13a is altered due to manufacturing tolerances; the head part 12 is also securely mounted on the support rods 13a and 13b in cases where the shape of the support rods deviates from the intended shape, or the spacing between the support rods 13a and 13b deviates from the intended spacing.

Figure 10:
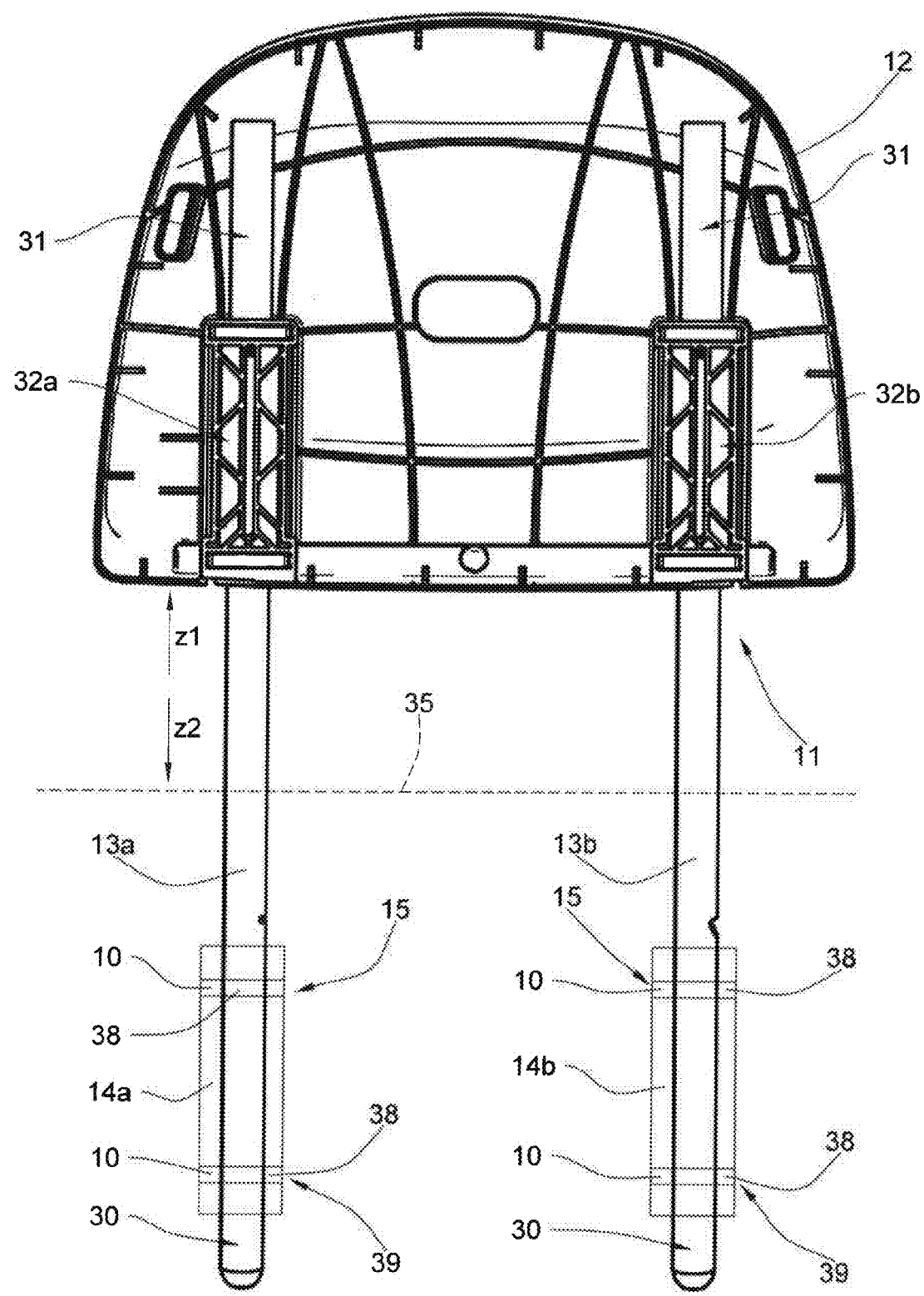
FIG. 10 is a rear view of a second embodiment of the headrest.

According to an alternative embodiment shown in FIG. 10, the support rods 13a and 13b are fixed to the head part 12—for example locked thereto. The head part 12 cannot move in the directions z1, z2. The support rods 13a and 13b can move in the directions z1, z2 relative to the guides 14a and 14b. Each guide 14a and 14b has an upper bearing seat 15 and a lower bearing seat 39. An insert 38, with the bearing 10, is arranged in each bearing seat 15 and 39.

The invention claimed is:

1. In combination with a motor-vehicle headrest, a support spaced from the headrest, and a rod extending along an axis between the headrest and the support, a bearing in the headrest or in the support, the bearing comprising:
    a frame forming an opening centered on the axis and through which the rod passes axially, the frame completely surrounding the opening;
    angularly extending arms angularly equispaced about the axis in the frame about the opening relative to the axis and each having an inner end fixed to the support and, spaced angularly therefrom relative to the axis, an outer end that is radially deflectable relative to the axis; and
    a spring annularly surrounding the opening and bearing radially inwardly on at least the outer ends of the arms to urge the arms radially inward into engagement with the rod.

2. The combination according to claim 1, wherein each arm is elastically deformable.

3. The combination according to claim 1, wherein each arm at least partially forms a concavity open toward the opening.

4. The combination according to claim 1, wherein the spring is a circular spring.

5. The combination defined in claim 1, wherein the bearing has a maximum dimension measured parallel to the axis that is substantially smaller than its maximum dimension measured perpendicular to the axis.

6. The combination defined in claim 5, wherein the arms are all identical and are unitarily formed with the frame of an elastically deformable material.

7. The combination defined in claim 1, wherein the spring engages each arm from the respective inner end to the respective outer end.

* * * * *